United States Patent
Crain

[11] 3,860,929
[45] Jan. 14, 1975

[54] CONFORMAL ARRAY ANTENNA/RECEIVER PROCESSOR SYSTEM

[75] Inventor: Gerald E. Crain, Richardson, Tex.

[73] Assignee: Texas Instruments Incorporated, Dallas, Tex.

[22] Filed: May 7, 1973

[21] Appl. No.: 358,219

[52] U.S. Cl. ............ 343/113 R, 343/16 M, 343/119
[51] Int. Cl. ............................................. G01s 3/22
[58] Field of Search .............. 343/16 M, 113 R, 119

[56] References Cited
UNITED STATES PATENTS

| | | | |
|---|---|---|---|
| 3,636,563 | 1/1972 | Laverick et al. ................ | 343/113 R |
| 3,740,750 | 6/1973 | Moulton ............................ | 343/119 |
| 3,794,998 | 2/1974 | Pearson, Jr. et al. ............ | 343/16 M |

Primary Examiner—Richard A. Farley
Assistant Examiner—Richard E. Berger
Attorney, Agent, or Firm—Harold Levine; Rene E. Grossman; Alva H. Bandy

[57] ABSTRACT

A monopulse direction finding receiver/processor system is described utilizing a three dimensional conformal antenna array, such as a circular cylindrical array, which generates a broad elevation, narrow azimuth beam therefrom. Both even and odd excitations are applied to the aperture of the antenna to simultaneously generate a monopulse pair of patterns. The azimuth complex sum ($\Sigma$) and difference ($\Delta$) returns from the array antenna are coupled to a phase/amplitude receiver which incorporates parallel receiver channels. The output from the phase/amplitude receiver produces a signal on each channel, one related to the ratio of the magnitude of $\Delta$ and $\Sigma$, (namely $|\Delta/\Sigma|$) and the other channel related to the phase difference between $\Delta$ and $\Sigma$ (namely $\angle\Delta/\Sigma$). These signals are coupled to a processor, such as an addressable read-only memory, which uniquely defines the azimuth and elevation angles for the specified angles $|\Delta/\Sigma|$ and $\angle\Delta/\Sigma$ over the region of the main beam.

23 Claims, 10 Drawing Figures

CONFORMAL ARRAY ANTENNA/RECEIVER PROCESSOR SYSTEM

This invention relates to antenna receiving systems and more particularly to a method and apparatus for determining azimuth and elevation information from a three dimensional conformal antenna array monopulse receiver/processor.

An array antenna consists of a number of individual radiating elements suitably spaced with respect to one another. The relative amplitude and phase of the signals applied to each of the elements are controlled to obtain the desired radiation pattern from the combined action of all the elements. The radiating elements might be dipoles, waveguide horns, or any other type of antenna. A more detailed treatment of array antennas may be found in the book *Introduction to Radar Systems* by M. I. Skolnik, 1962, McGraw-Hill Book Company, pages 294–320. With a planar (two dimensional) antenna array, there is no way to uniquely define the specific elevation angle of a target in order to thereby determine the proper azimuth representation of that target based upon the measured azimuth monopulse function $|\Delta/\Sigma|$. This is because a planar, two dimensional array antenna exhibits the characteristic that the azimuth monopulse function produces a constant phase relationship which allows no elevation information to be extracted therefrom. Accordingly conventional monpulse receiver/processors have required both azimuth and elevation monopulse functions to obtain azimuth and elevation of an unknown target in a direction finding system.

Accordingly it is an object of the present invention to provide a conformal array monopulse direction finding receiver system which allows extraction of azimuth and elevation information from only the unique relationship of the azimuth monopulse function magnitude and phase.

Another object of the present invention is to provide a conformal array monopulse direction finding receiver system which allows extraction of azimuth and elevation information on the basis of a single pulse or hit of a target processed at angles away from the azimuth monopulse null.

Another object of the present invention is to provide a conformal array monopulse direction finding receiver system whihc requires but one pair of signals for determining both azimuth and elevation angles of a target.

A further object of the present invention is to provide a conformal array monopulse direction finding receiver system which improves system accuracy by reducing bias errors therein.

A still further object of the present invention is to reduce system complexity and accompanying reduction in cost of a conformal array monopulse direction finding system by utilizing only the azimuth monopulse function to obtain azimuth and elevation information.

A still further object of the present invention is to provide a conformal array monopulse direction finding receiver system which gives a unique, unambiguous, single-valued indication of angle of arrival information over a wide range of elevation angles.

Other objects and features of the invention will become more readily understood from the following detailed description and appended claims when read in conjunction with the accompanying drawings in which like reference numerals designate like parts throughout the FIGURES thereof, and in which:

Figure 1:
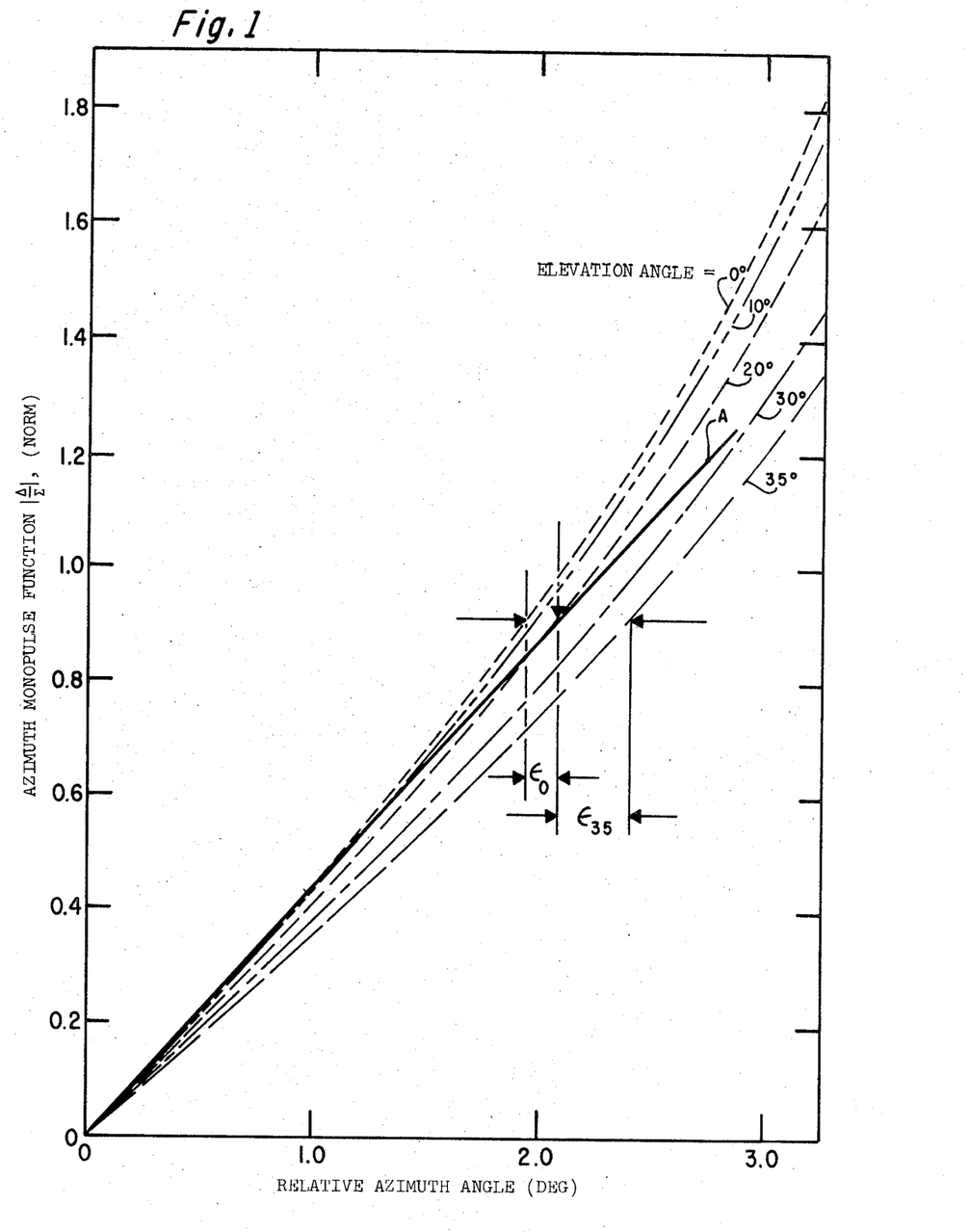
FIG. 1 is a plot of azimuth monopulse function magnitude versus relative azimuth angle for various elevation angles for a non-conformal (planar) array antenna.

Referring now to FIG. 1, there is illustrated a plot of the azimuth monopulse function magnitude $|\Delta/\Sigma|$ versus azimuth angle $\theta$ for various elevation angles $\alpha$ of a target in a direction finding system utilizing a non-conformal (planar, for example) array antenna. The only measurable parameter in an azimuth monopulse direction finding system utilizing a non-conformal array antenna is the ratio $|\Delta/\Sigma|$ which is primarily and "imaginary" quantity, that is, the ratio exhibits a quadrature relationship, i.e., 90°. The curves illustrated can be derived from targets whose elevation angles are known. However, with a non-conformal array antenna, there is no way to uniquely define the specific elevation angle, $\alpha$, of an unknown target to thereby particularly define which is the elevation curves should be utilized to obtain the proper azimuth representation of that target based only upon the measured azimuth monopulse function $|\Delta/\Sigma|$. Line A in FIG. 1 represents a linear segment approximation of the five elevation curves for $\alpha=0°$, 10°, 20°, 30° and 35°. Utilizing the linear line segment A, then for a known monopulse function magnitude $|\Delta/\Sigma|$, the estimated relative azimuth angle $\hat{\theta}$ is approximated by the following equation:

$$\hat{\theta} = K |\Delta/\Sigma| \qquad (1)$$

where K is related to the slope of the line A. If the elevation angle, for example, is actually at $\alpha=0°$, then the bias error at $|\Delta/\Sigma| = 0.9$ is illustrated in FIG. 1 as $\epsilon_0$; similarly for an actual elevation angle at $\alpha=35°$ and $|\Delta/\Sigma| = 0.9$, then the bias error is illustrated in FIG. 1 as $\epsilon^{35}$. Bias error is defined as the difference between the estimated relative azimuth angle and the true angle of arrival. Thus, utilizing equation (1), the bias error is defined as $$\epsilon = \theta - \hat{\theta} = \theta - K |\Delta/\Sigma| \qquad (2)$$

Referring to FIG. 1, $\epsilon_0 \approx 0.1°$ and $\epsilon_{35} \approx 0.3°$.

Figure 2:
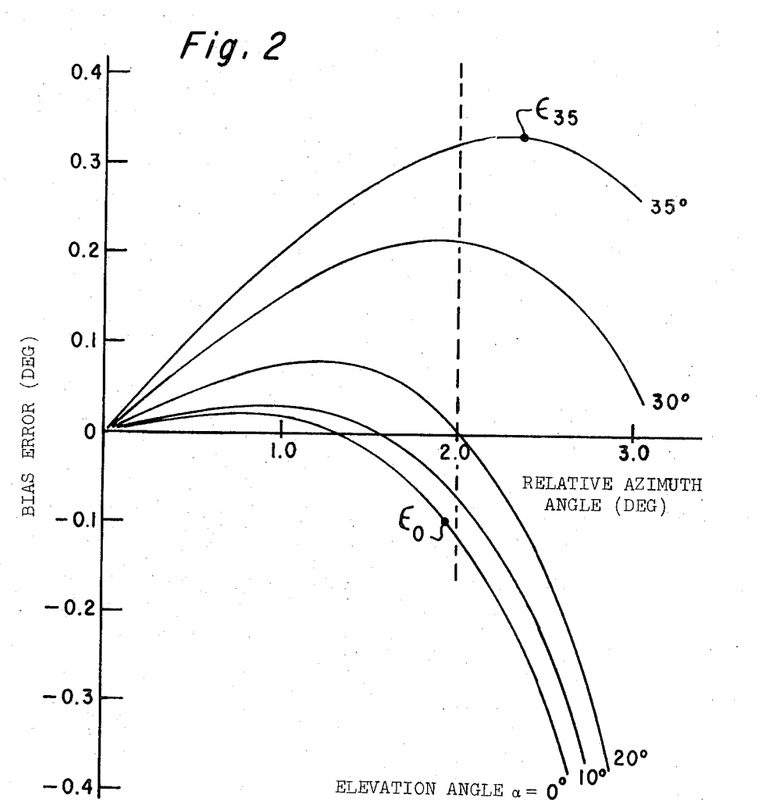
FIG. 2 is a plot of bias error versus relative azimuth angle for various elevation angles for a non-conformal array antenna whose characteristics are shown in FIG. 1.

FIG. 2 illustrates a plot of bias error for a nonconformal antenna versus relative azimuth angle with elevation angle as a parameter. The bias errors $\epsilon_0$ and $\epsilon_{35}$ illustrated in FIG. 1 are also designated on FIG. 2. With a 2.0° relative azimuth offset, it can be seen for a conventional system at an elevation angle $\alpha = 0°$, the bias error is 0.11, at $\alpha = 10°$ the bias error is 0.07, at $\alpha = 20°$ the bias error is 0, at $\alpha = 30°$ the bias error is 0.22 and for $\alpha = \pm°$ the bias error is 0.33.

Accordingly it is desired to more closely approximate which elevation curve is being utilized in order to reduce the bias error of the system and more accurately define the azimuth angle to the unknown target. This can be accomplished with a three dimensional conformal array antenna system utilizing only azimuth monopulse information as there is angular or phase information (symbolized as $\angle \Delta/\Sigma$) associated with the azimuth monopulse function which is a measurable quantity and defines a unique relationship between the azimuth mon0pulse function and the azimuth angle and further requires no a priori knowledge of the target location (through elevation angle information, as was illustrated in FIG. 1). This will be further explained in connection with the following FIGURES.

Figure 3:
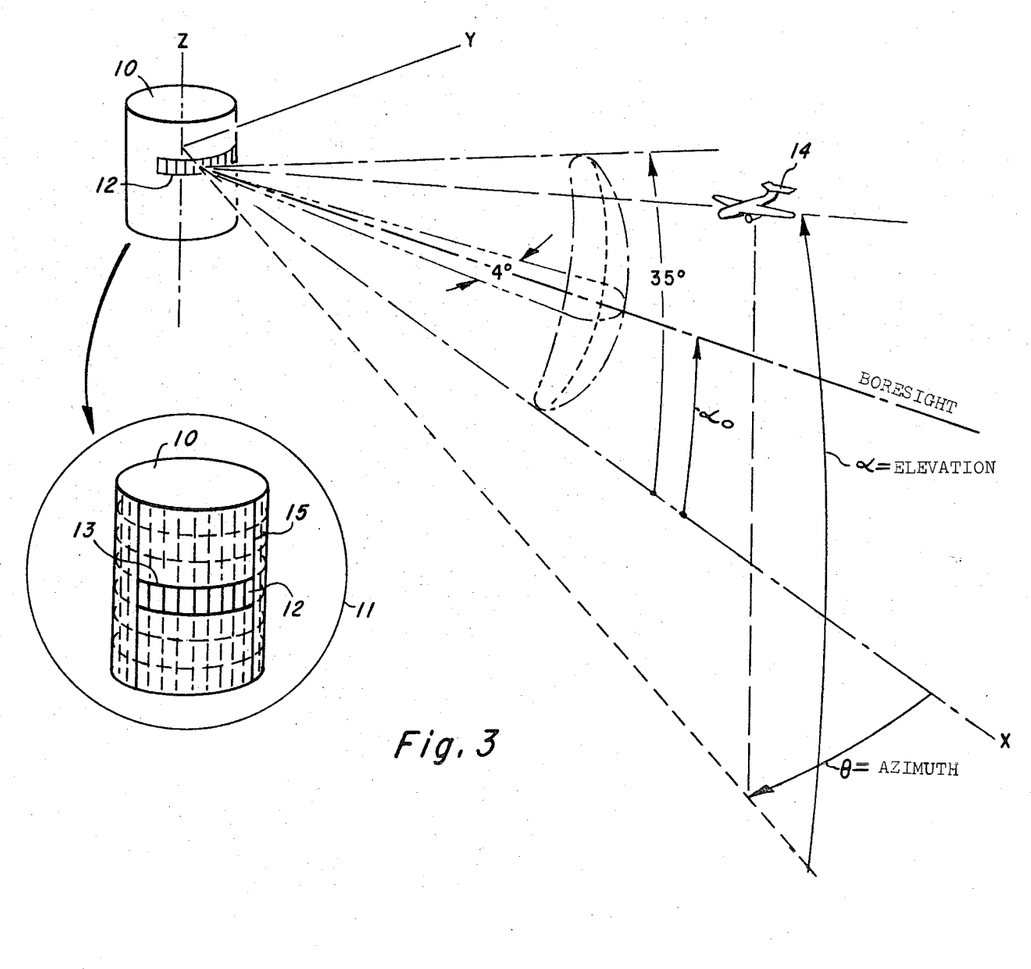
FIG. 3 illustrates a circular cylindrical antenna array and the antenna pattern formed thereby.

FIG. 3 illustrates a conformal (three dimensional) array antenna 10 which, in the embodiment illustrated, is shown as a circular cylindrical array. Individual antenna elements 12 (shown more clearly in the enlarged insert 11) are shown as an arc 13 mounted on the circular cylinder; if the elements 12 completely surround the cylinder, 360° coverage can be obtained. For purpose of the invention described herein, the radiating elements 12 might also be mounted on the surface of a sphere, or indeed on any object of any shape providing that the shape is non-planar, i.e., three dimensional. A plurality of arc segments 13 are excited to form an active section 15 which generates an antenna pattern which is narrow in azimuth and broad in elevation. For purposes of explanation only, the elevation angle range will be assumed to be 35° while the azimuth range is approximately 2° on either side of boresight (or 4° total). In the direction finding system to be described herein, the goal is to determine from the azimuth monopulse return information the azimuth and elevation angles of a target 14. Although the antenna elements 12 are only shown for one quarter of the cylindrical antenna 10, as mentioned above in order to obtain 360° coverage, the antenna elements 12 would completely encircle the cylinder. In order to obtain this coverage, the beam pattern of array antenna 10 is successively incremented by commutating the active section 15 over the total number of elements in a step-by-step fashion. Accordingly, to obtain the absolute azimuth angle $\theta$ to target 14, the gross pointing address, that is, the azimuth boresight angle (broadside) of the antenna beam pattern at the time of interrogation of the target must be known.

Figure 4:
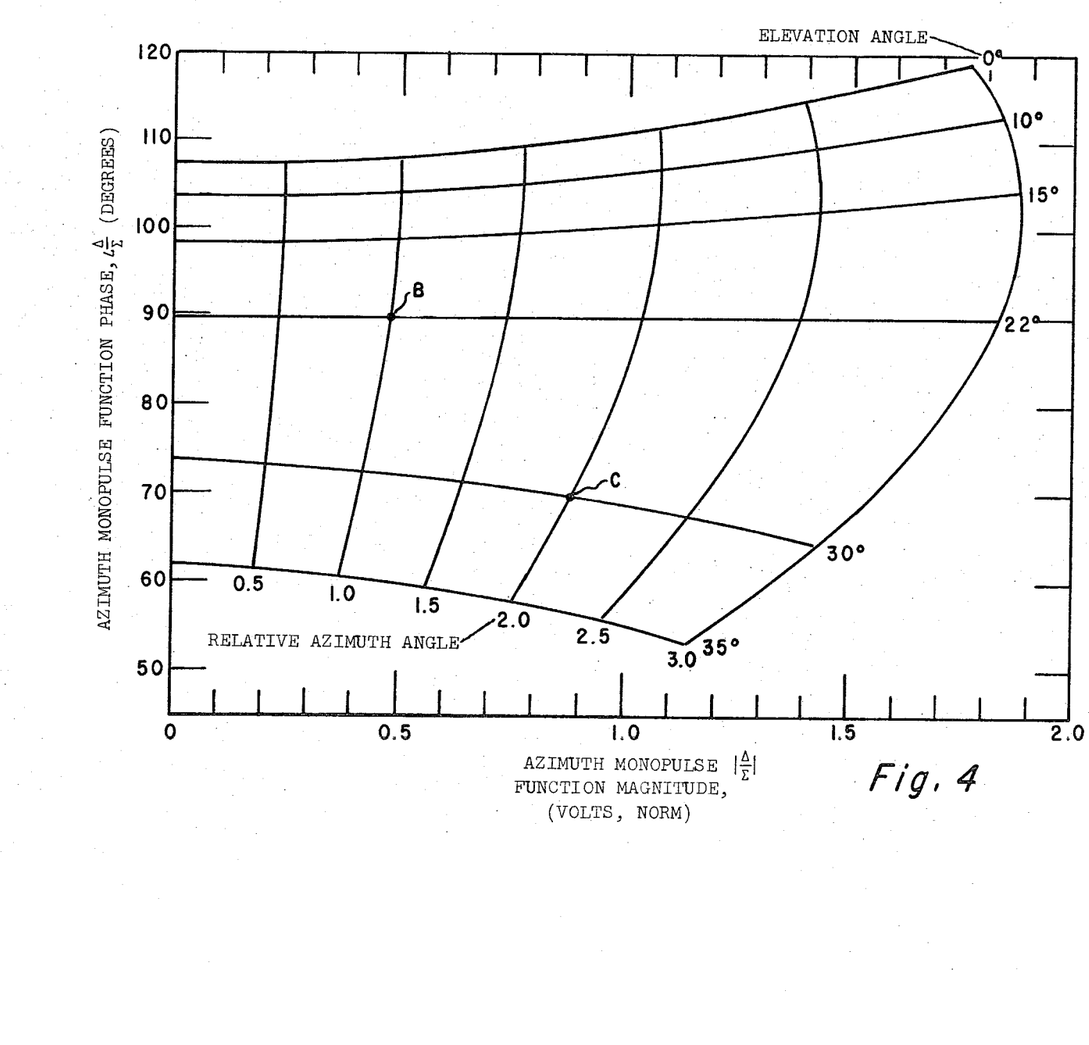
FIG. 4 is a plot of monopulse function phase versus monopulse function amplitude for constant elevation/azimuth angles for the arc array illustrated in FIG. 3.

FIG. 4 plots the magnitude of the monopulse function ($|\Delta/\Sigma|$) versus the phase of the monopulse function ($\angle \Delta/\Sigma$) for constant elevation/azimuth contours. This data was derived from array antenna system 10 illustrated in FIG. 3 and the elevation angle contours vary between 0 to 35°; the relative azimuth angle contours (running generally vertically) vary between 0.5 and 3.0°. The key to this plot is that because the antenna elements 12 do not lie in a straight line (that is, they are curved), the phase variation of the even mode $\Sigma$ and the odd mode $\Delta$ patterns derived from antenna 10 will not be identical functions of the relative azimuth angle; that is, the ratio $\Delta/\Sigma$ will be a complex function dependent upon the position or target 14 within the antenna beam pattern. As can be seen from FIG. 4, only at the plane of boresight (boresight angle $\alpha_0$ equals 22° elevation in FIG. 3) do the sum and difference patterns ($\Sigma$ and $\Delta$, respectively) exhibit the normal quadrature relationship (that is, they are 90° out of phase with respect to each other). At elevation angles away from boresight, and within the relative azimuth coverage (between 0 and 2.5° relative azimuth), the elevation azimuth contours map uniquely onto the monopulse function magnitude/phase coordinate plot of FIG. 4. Utilizing this type of complex azimuth monopulse function, therefore, elevation angle information also may be determined from the information available to the monopulse receiver without the use of any encoded information on the return from target 14 (and without having to generate the elevation monopulse function which adds to system complexity and cost for a conformal array receiver/processor).

The type of complex monopulse function illustrated in FIG. 4 will be obtained with any conformal, non-planar array antenna. The complex nature of the azimuth monopulse function has been discovered to be attributable entirely to the behavior of each arc array 13 (FIG. 3) radiation pattern. The pattern from the active section 15 (FIG. 3) maintains this behavior. It should be emphasized that normally the sum ($\Sigma$) and difference ($\Delta$) returns maintain a nearly constant, quadrature (90°) relationship which is the principle upon which some monopulse receivers/processors are designed; this principle, it has been discovered, does not hold true with conformal arrays as shown in FIG. 4 and the variation from that constant phase relationship can be utilized to obtain both relative azimuth monopulse function as shown in FIG. 4 provides an exclusive 1:1 mapping of the azimuth angle of arrival over the elevation coverage region. The simplest form of two dimensional processor which would utilize the principle discovered in FIG. 4 is a tabular representation of the data therein which can be incorporated in an addressable read-Only memory such that by merely addressing the complex return in terms of both phase ($\angle \Delta/\Sigma$) and magnitude ($|\Delta/\Sigma|$), the appropriate ordinate and abscissa can be determined to retrieve the relative azimuth and elevation angle information. Another approach for the two dimensional processor would be through the use of an algebraic estimator which uses magnitude and phase determined parameters of the azimuth monopulse function. Both processors will be described and form a part of the present invention.

Figures 5, 7:
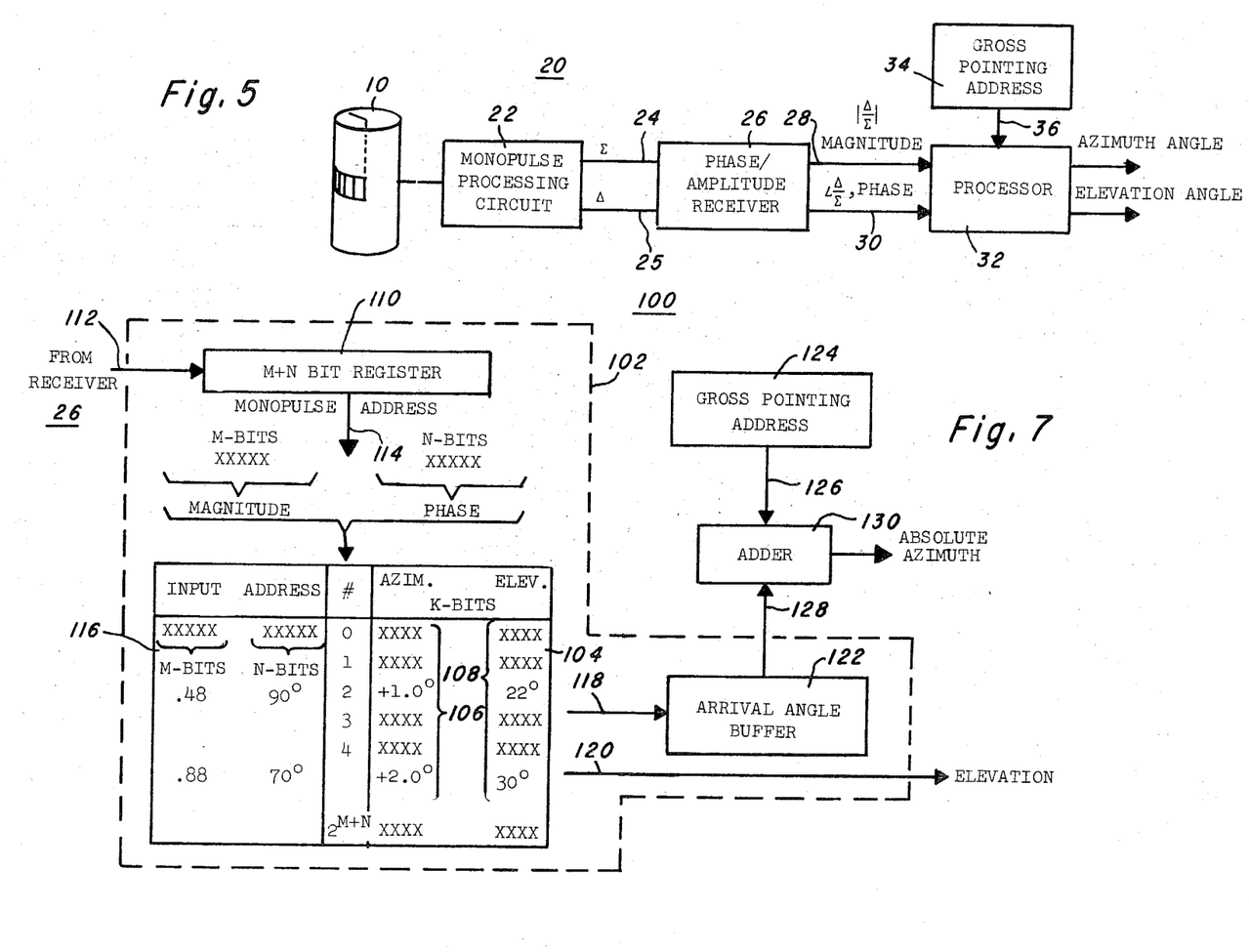
FIG. 5 is a block diagram of the receiver/processor according to the present invention.
FIG. 7 is a detailed block diagram of the digital processor illustrated in FIG. 5.

FIG. 5 illustrates the block diagram of the monopulse complex receiver/processor system. This system is comprised of the three dimensional array antenna 10 coupled to a monopulse processing circuit 22 which produces the azimuth even ($\Sigma$) and odd ($\Delta$) mode excitations from antenna 10 on lines 24 and 25. Processing circuit 22 may be, for example, a hybrid ring with the $\Delta$ signal representing the difference energy received in azimuth at antenna 10. These signals are applied as inputs to a complex phase/amplitude receiver 26 which incorporates two parallel channels for producing the azimuth monopulse function magnitude $|\Delta/\Sigma|$ on line 28 and the azimuth monopulse function phase $\angle \Delta/\Sigma$ on line 30. These signals on lines 28 and 30 are coupled to processor 32. Also coupled to processor 32 is a gross pointing address signal 34 which is coupled via line 36 to processor 32. The gross pointing address signal provides an indication of the boresight angle to which the array antenna 10 is pointing at the time of interrogation. Processor 32 utilizes the magnitude and phase information of the complex monopulse function along with the gross pointing address 34 to provide the absolute azimuth and elevation angle of target 14 (in FIG. 3).

Figure 6:
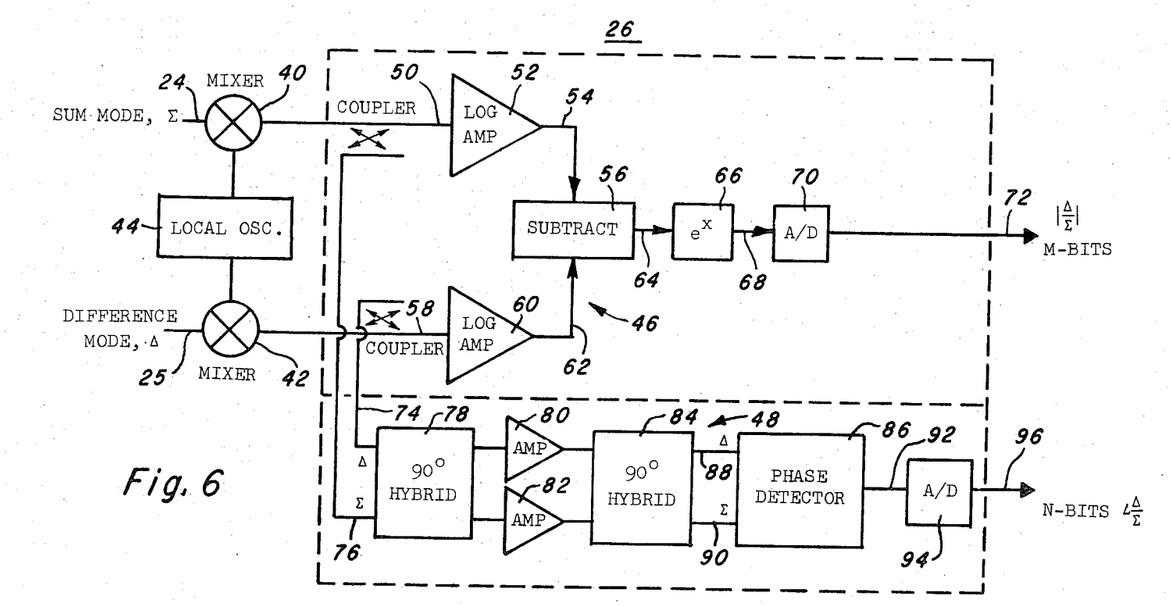
FIG. 6 is a more detailed block diagram of the receiver illustrated in FIG. 5.

FIG. 6 illustrates a more detailed block diagram of the complex phase/amplitude receiver 26 illustrated in FIG. 5. The sum mode $\Sigma$ and difference mode $\Delta$ are input via conductors 24 and 25, respectively, to mixers 40 and 42. Local oscillator 44 is also coupled to mixers 40 and 42 and each of the mixers covert the incoming RF signals to IF for further processing in receiver 26. The IF $\Sigma$ and $\Delta$ signals are then independently processed in two dual or parallel channels 46 and 48. In channel 46, the sum signal is coupled by line 50 to log amplifier 52, the output 54 of which is coupled to one input of subtract of difference circuit 56. The IF difference signal $\Delta$ is coupled by way of line 58 to log amplifier 60, the output 62 of which is coupled to the second input of subtract or difference circuit 56. The outputs 54 and 62 from log amplifier 52 and 60 are of the form $ln\Sigma$ and $ln\Delta$, respectively. The output 64 from subtract or difference circuit 56 is of the form $ln\Delta - ln\Sigma$ or $ln\Delta/\Sigma$. Output 64 is coupled to an exponential circuit 66 which, in turn, produces an output 68 equal to the magnitude of the ratio of $\Delta$ to $\Sigma$, i.e. $|\Delta/\Sigma|$. This output is coupled to A/D converter 70 which transforms the ratio into digital form on output 72 composed of M bits of digital information.

The second channel 48 of receiver 26 couples the sum and difference signals $\Delta$ and $\Sigma$ along conductors 74 and 76, respectively, to 90° hybrid circuit 78. The outputs from the hybrid circuit 78 are input to amplifiers 80 and 82 which are coupled to another 90° hybrid circuit 84 similar to hybrid circuit 78. Hybrid circuits 78 and 84 impart a 90° phase shift to one of the input signals with respect to the other and mixes or combines the input signals applied thereto. Amplifiers 80 and 82 amplify the signal levels of the $\Delta$ and $\Sigma$ signals in order to impart to them a magnitude sufficient to enable adequate detection by phase detector 86. The amplified signal $\Delta$ on line 88 and the amplified signal $\Sigma$ on line 90 are coupled to the input of phase detector 86 which produces a positive or negative signal whose magnitude is an indication of the phase difference between $\Delta$ and $\Sigma$ and whose polarity is indicative of the sign of the angle. The output 92 from phase detector 86 is coupled to A/D converter 94 which produces a digital representation on output 96 of the analog signal of the phase difference of the ratio $\Delta/\Sigma$ with its sign. The digital representation on output 96 is composed of N bits of digital information. Accordingly receiver 26 produces two digital outputs from channels 46 and 48 representing the magnitude of the ratio $\Delta/\Sigma$ and the phase difference therebetween. The individual circuits utilized in the receiver are conventional circuitry.

FIG. 7 illustrates a detailed block diagram of a digital processor 100 which can be utilized as the processor 32 illustrated in FIG. 5. The heart of the processor 100 is a read-Only memory circuit (ROM) 102. The memory matrix 104 of ROM 12 is a tabular representation of the data included in the graph of FIG. 4. The relative azimuth digital representations 106 and the elevation digital representations 108 are included in memory matrix 104, the values of which are derived from FIG. 4 corresponding to specific magnitude and phase values for the complex azimuth monopulse function. The outputs 72 and 96 from dual channel receivere 26 (FIG. 6) are sequentially entered into M+N bit register 110 by way of line 112. This M+N bit work represent the monopulse address 114 for ROM 102. Accordingly, this input address is a M+N bit word with the first N bits representing the phase and the latter M bits representing magnitude. ROM 102, therefore, will have $2^{M+N}$ input addressable entries of K-bits. The mapping function of the curves of FIG. 4 into a tabular representation for use in ROM 102 can be demonstrated as follows. In the input address section 116 of ROM 102, when the magnitude $|\Delta/\Sigma|$ is 0.48 and the monopulse phase angle $|\Delta/\Sigma|$ is 90°, a digital output representative of a relative azimuth angle of +1.0 degree will be present on line 118. A digital representation of the elevation angle of 22° will appear on line 120. This corresponds to point B in FIG. 4. In a similar manner, for $|\Delta/\Sigma|$ equal 0.88 and $L\ \Delta/\Sigma$ equal to 70°, the digital outputs on lines 118 and 120 will be +2.0° and 30° for relative azimuth and elevation, respectively. This corresponds to point C in FIG. 4.

The relative azimuth signal present on line 118 is the deviation of the target 14 (see FIG. 1) from the boresight angle at the time of interrogation. This digital azimuth signal is stored in arrival angle buffer 122. Gross pointing address register 124 provides a digital representation of the boresight angle at the time of interrrogation of target 14. The output from register 124 on line 126 and the output from the register 122 on line 128 are algebraically combined in adder 130 to give the absolute azimuth angle. It will be remembered that one of the bits of digital information representing the relative azimuth angle on line 128 represents the sign of the phase angle. This sign must be maintained and included as an input to adder 130 in order to maintain left-right information of target 14 (FIG. 3) with respect to boresight.

Figure 8:
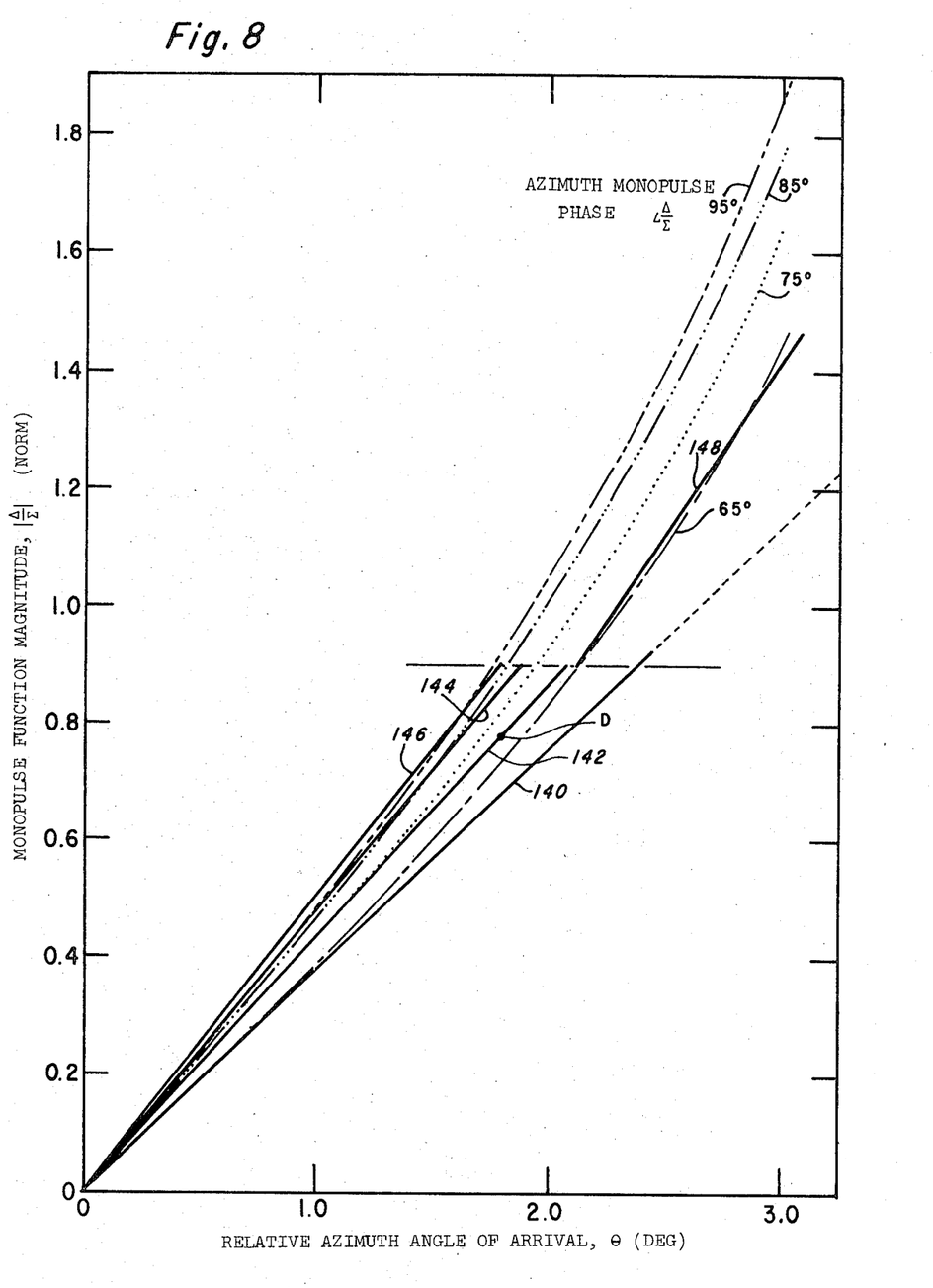
FIG. 8 is a plot of the monopulse function magnitude versus relative azimuth angle for varying monopulse phase angles and the linear segment approximations thereof.

FIG. 8 is a plot of the azimuth monopulse function magnitude $|\Delta/\Sigma|$ versus relative azimuth angle of arrival $\theta$ for varying azimuth monopulse function phase angles $L\ \Delta/\Sigma$. These plots may be derived directly from the plot of FIG. 4 but removing elevation angle as a parameter. As can be seen from the curves of FIG. 8, there exists a region over which the curves are quite linear at any given azimuth monopulse phase angle. MOre explicitly, the curves illustrated in FIG. 9 may be constructed of straight line segments 140–146 whose slopes and intercept (with the "y" axis) may be determined by the azimuth monopulse function magnitude and phase. Segment 140 is a linear approximation of curves where $L\ \Delta/\Sigma$ is less than or equal to 65°. Segment 142 is an approximation for the curves when $L\ \Delta/\Sigma$ is between 65° and 75°; segment 144 is an approximation of the curves when $L\ \Delta/\Sigma$ is between 75 and 85° and segment 146 is an approximation of the curves when $L\ \Delta/\Sigma$ is greater than 85°. Using these linear segment approximations, the azimuth angle of arrival $\theta$ can be determined from the measured quantities available, namely the azimuth monopulse function magnitude $|\Delta/\Sigma|$ and the azimuth monopulse function phase $L\ \Delta/\Sigma$.

The general equation for a straight line is
$$y = kx + b \quad (3)$$

where in the case of FIG. 8, $y$ = monopulse function magnitude $|\Delta/\Sigma|$
$x$ = azimuth angle of arrival $\theta$
$k$ = the slope of either segments 140–146, and
$b$ = the intercept of segments 140–146 with the y-axis.

Applying equation (3) to the line segments 140–146 of FIG. 8, $$|\Delta/\Sigma| = K'(\angle \Delta/\Sigma, |\Delta/\Sigma|) \cdot \theta + B'(\angle \Delta/\Sigma, |\Delta/\Sigma|) \quad (4)$$

where $|\Delta/\Sigma|$ is the monopulse function magnitude
$K'(\angle \Delta/\Sigma, |\Delta/\Sigma|)$ is the slope of segments 140–146
$\theta$ is the azimuth angle of arrival, and $B'(\angle \Delta/\Sigma, |\Delta/\Sigma|)$ is the intercept of segments 140–146 with the magnitude $|\Delta/\Sigma|$ axis. Inversion of equation (4) gives an approximation for the estimated azimuth angle of arrival $\theta$, namely $$\hat{\theta} = (1/K'(\angle \Delta/\Sigma, |\Delta/\Sigma|)) [|\Delta/\Sigma| + B'(\angle \Delta/\Sigma, |\Delta/\Sigma|)] \quad (5)$$

$$\hat{\theta} = K(\angle \Delta/\Sigma, |\Delta/\Sigma|) \cdot |\Delta/\Sigma| + B(\angle \Delta/\Sigma, |\Delta/\Sigma|) \quad (6)$$

where $K(\angle \Delta/\Sigma, |\Delta/\Sigma|) = 1/K'(\angle \Delta/\Sigma, |\Delta/\Sigma|)$ $B(\angle \Delta/\Sigma, |\Delta/\Sigma|)$ $B'(\angle \Delta/\Sigma, |\Delta/\Sigma|)/K'(\angle \Delta/\Sigma, |\Delta/\Sigma|)$ As can be seen from FIG. 8, the four straight line segment approximations 140–146 are good approximations of the monopulse function curves below the monopulse function magnitude $|\Delta/\Sigma|$ of 0.9. Above $|\Delta/\Sigma|$ of 0.9 segment 140, for example, departs rapidly from the 65° curve for $\angle \Delta/\Sigma$ (shown by the dotted line extension of segment 140).

For segments 140–146, the intercept B' (and therefore B) equals to zero. Accordingly equation (6) reduces to $$\hat{\theta} = K(\angle \Delta/\Sigma, |\Delta/\Sigma|) \cdot |\Delta/\Sigma| \quad (7)$$

With this simplification it can be seen that there may exist four possible estimates of the slop using segments 140–146 as listed in Table I below.

TABLE I

| Segment | $\angle \Delta/\Sigma$ | $K(\angle \Delta/\Sigma, |\Delta/\Sigma|)$ |
|---------|------|-------|
| 140 | ≤ 65° | 2.65 |
| 142 | 65–75° | 2.25 |
| 144 | 75–85° | 2.04 |
| 146 | >85° | 1.94 |

Therefore, knowing the estimates for the mean slope of segments 140–146 (as listed above) for the range of monopulse function phases $\angle \Delta/\Sigma$ and knowing the measured monopulse function magnitude $|\Delta/\Sigma|$, and algebraic processor may be untilized for processor 32 (shown in FIG. 5). The algebraic processor would work as follows. Assume that a monopulse function magnitude $|\Delta/\Sigma|$ was measured by receiver 26 as 0.8 and that the phase $\angle \Delta/\Sigma$ was measured as 66°. Since the phase was in the range between 65° and 75°, the line segment approximation 142 would be used. Substituting these values into equation (7) above, we obtain $$\hat{\theta} = K_{142} \cdot |\Delta/\Sigma| \quad (8)$$

where the parameter $K_{142}$ is obtained from Table I above for segment 142

$$\hat{\theta} = 2.25 \times 0.8 = 1.8°$$

This is illustrated as point D in FIG. 8.

Figure 9:
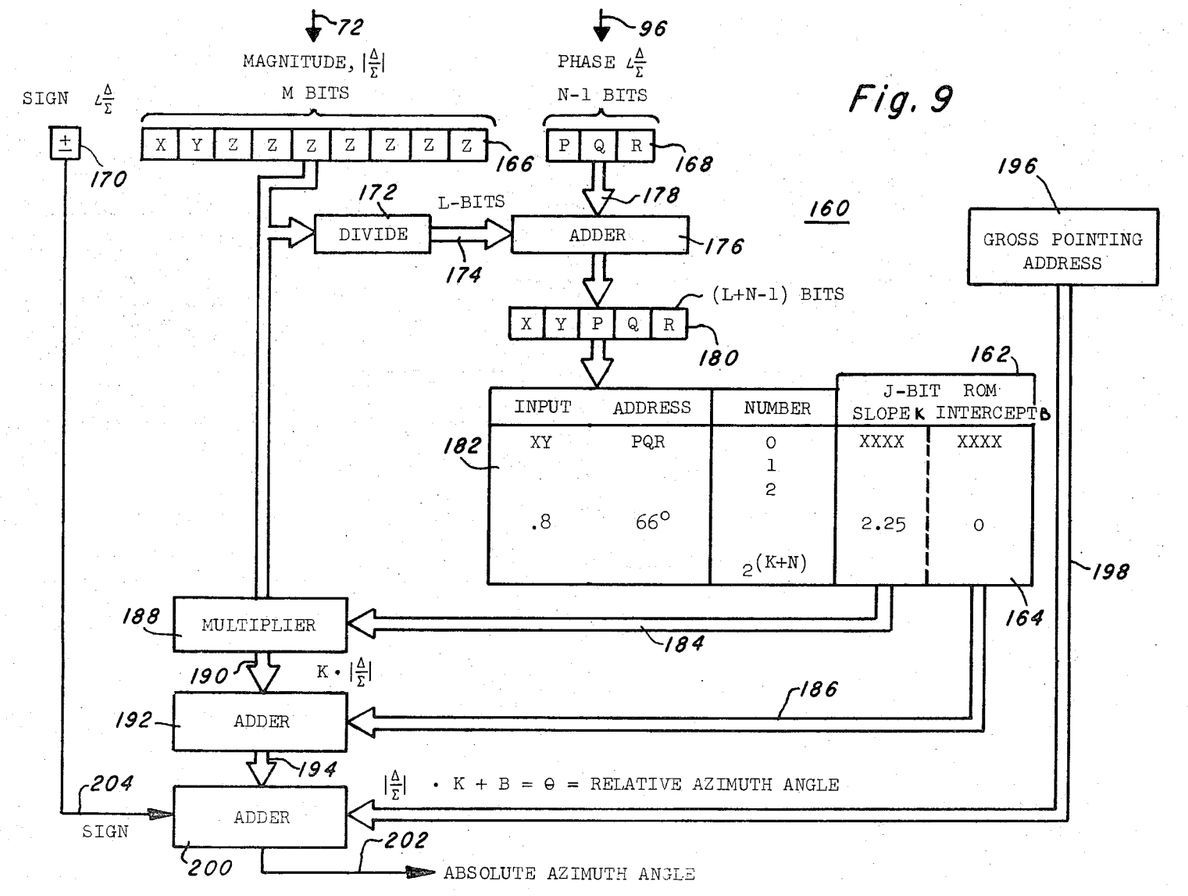
FIG. 9 is another embodiment of the digital processor of FIG. 5 utilizing the linear approximation segments of FIG. 8.

FIG. 9 is a block diagram of a digital processor which implements the linear estimation technique described in conjunction with FIG. 8 and which can be utilized in the processor 32 (illustrated in FIG. 5). This processor 160 utilizes a J-bit read-only memory (ROM) 162, the memory matrix portion 164 of which includes the digital representation of the slope and intercept related parameters of segments approximating the curves in FIG. 8, such as segments 140–146. Although segments 140–146 are illustrated in FIG. 8 as having a zero intercept (i.e., B'=0), it will be noted that a closer approximation of the curves over a wider range of relative azimuth could be obtained if breakpoints were introduced in the straight line approximations (and also by increasing the number of phase determined slope parameters). If breakpoints were introduced (say at $|\Delta/\Sigma| = 0.9$,) then the new segments formed would have an intercept B' different from zero. The values B would be stored in memory matrix 164 along with the respective slopes of the new segments above $|\Delta/\Sigma| = 0.9$. An exemplary new line segment 148 is illustrated for monopulse function phase angles less than 65° and the breakpoint occurring at $|\Delta/\Sigma| = 0.9$. New line segments would also be used (although not illustrated) for segments 142–146 for values of $|\Delta/\Sigma|$ above 0.9.

The digital representation of the magnitude of the monopulse function $|\Delta/\Sigma|$ on line 72 (from receiver 26 illustrated in FIG. 6) is entered into an M-bit register 166. The digital representation of the phase of the monopulse function $\angle \Delta/\Sigma$ on line 96 (from receiver 26 illustrated in FIG. 6) is entered into register 168 while the sign bit is entered into register 170. The output from register 166 goes through divide circuit 172 as only the most significant digits representative of the gross approximation of the magnitude of $|\Delta/\Sigma|$ is required. In other words, only L-bits are present on lines 174 (where $L < M$). The digital representation of phase is entered into adder 176 along lines 178 along with the digital output from lines 174 to produce a monopulse address 180 which is comprised of (L+N−1) bits. This monopulse address is entered into ROM 162 by way of the input address decoder section 182 which thereby automatically allows the slope and intercept related digital representations for that particular address to be read out of ROM 162 on lines 184 and 186, respectively. It is important to note that one of the advantages of this particular processor is that due to the linearity of the azimuth monopulse function shown in FIG. 8, only of few bits of stored information (L+N−1 bits as illustrated in FIG. 9) are required.

The output from register 166, namely $|\Delta/\Sigma|$, and the slope determined by the input address to ROM 162 are multiplied together in multiplier circuit 188 to produce on line 190 the signal representative of the first term in equation (6). The output 190 from multiplier 188 is entered into adder 192 which adds in the intercept related value; B, for the line segment selected by the input address. For line segments 140–146 (which intersect the origin of the plot in FIG. 8), the intercept is zero (B=0). For additional segments (such as segment 148, for example) above $|\Delta/\Sigma|$ equals 0.9, the intercept related value would be something other than 0 and would be added in via line 186. The output 194 for adder 192 is the digital representation of the relative azimuth angle of arrival from target 14 (shown in FIG. 3) and equivalent to equation (6) above.

Similar to the processor shown in FIG. 7, gross pointing address register 196 produces an output 198 which is indicative of the gross pointing angle at which the antenna beam pattern was directed at the time of interrogation. This output on line 198 is combined in adder 200 with the relative azimuth arrival angle estimate on line 194 to produce the absolute azimuth angle on line 202. The output 204 from register 170 is indicative of the sign of the angle $\angle \Delta/\Sigma$ which represents whether the target is to the left or right of boresight.

It only line segments 140–146 are needed to approximate the curves in FIG. 8, the processor of FIG. 9 can be simplified since the divide circuit 172 and adder 176 would then be unnecessary as well as the intercept storage capability of ROM 162 since the intercept value for segments 140–146 is always zero; still further, adder 192 would be unnecessary which is required to add in the intercept value to the output of multiplier 188.

Figure 10:
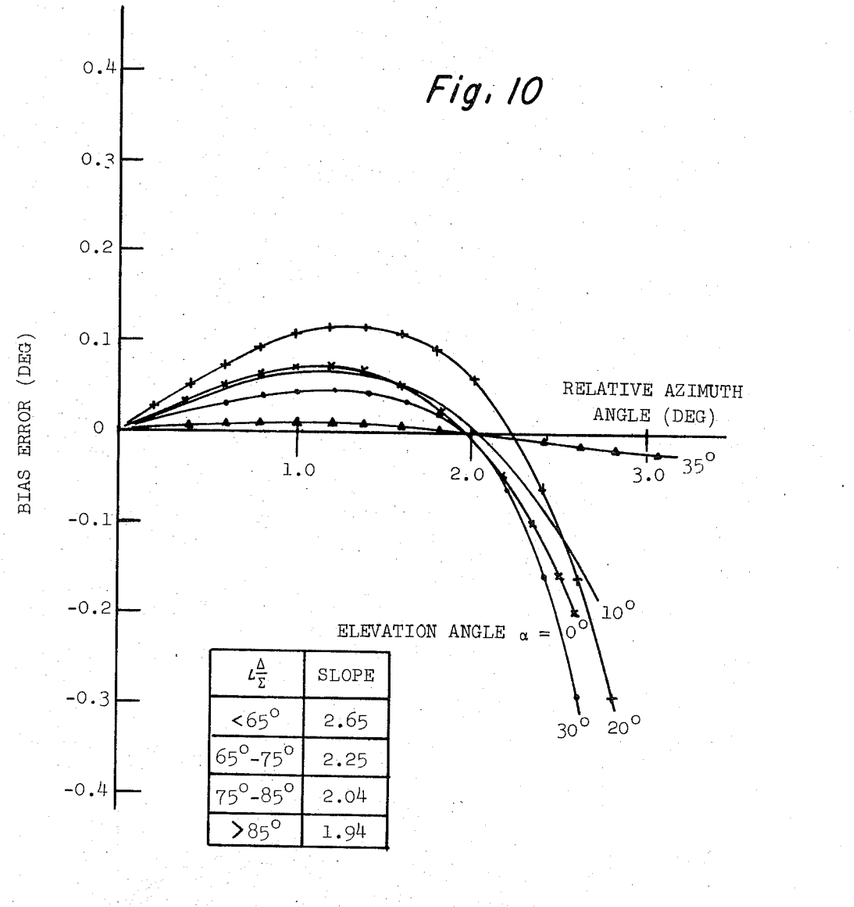
FIG. 10 is a plot of bias error versus relative azimuth angle for various elevation angles for the conformal array antenna characteristics shown in FIG. 9.

FIG. 10 illustrates the bias error versus relative azimuth angle with elevation angle as a parameter; the various bias curve plots shown in FIG. 10 are utilizing the line segment approximations 140–146 of the monopulse map illustrated in FIG. 9 having slope related parameters $[K(\angle \Delta/\Sigma, |\Delta/\Sigma|)]$ as depicted in FIG. 10. The improved performance (reduction in bias error) is readily seen from a comparison of the curves of FIGS. 2 and 10 and from Table II below.

TABLE II

| Azimuth Angle, $\theta$ | Elevation Angle, $\alpha$ | FIG. 2 Non-Conformal Bias Error | FIG. 10 Conformal Bias Error |
|---|---|---|---|
| 1.0 | 0° | 0.02 | 0.07 |
| | 10° | 0.03 | 0.06 |
| | 20° | 0.08 | 0.11 |
| | 30° | 0.15 | 0.04 |
| | 35° | 0.20 | 0.01 |
| 2.0 | 0° | 0.11 | 0.0 |
| | 10° | 0.07 | 0.0 |
| | 20° | 0.0 | 0.06 |
| | 30° | 0.22 | 0.0 |
| | 35° | 0.33 | 0.0 |

The improved performance of the receiver/processor is most noticeable at large elevation angles, such as 30° and 35°. At 2° azimuth and at an elevation angle of 30° and 35°, the bias error for the non-conformal antenna is very large, namely 0.22° and 0.33°, respectively, whereas for the linear estimator of FIG. 10, the bias error is zero for both elevation angles.

Although the present invention has been shown and illustrated in terms of a specific apparatus and methods, it will be apparent that changes or modifications can be made without departing from the spirit and scope of the invention as defined by the appended claims.

What is claimed is:

1. A monopulse receiver system for determining the direction to a target comprising:
   a. a three dimensional antenna array for receiving complex azimuth monopulse sum and difference signals, $\Sigma$ and $\Delta$,
   b. receiver means coupled to the array for producing the ratio of the magnitude of $\Sigma$ and $\Delta$, $|\Delta/\Sigma|$, and the phase difference therebetween, $\angle \Delta/\Sigma$, and
   c. process means coupled to said receiver means for estimating, responsive to monopulse return information, at least the azimuth to a target from a comparison with a predetermined tabulation of said functions $|\Delta/\Sigma|$ and $\angle \Delta/\Sigma$.

2. A system according to claim 1 wherein said processing means includes means for estimating elevation angle to said target.

3. A receiver according to claim 1 wherein said comparison is a linear estimation of said functions $|\Delta/\Sigma|$ and $\angle \Delta/\Sigma$ with respect to azimuth.

4. A monopulse receiver system for determining the direction to a target comprising:
   a. a three dimensional conformal antenna array for receiving azimuth complex sum and difference monopulse signals, $\Sigma$ and $\Delta$,
   b. receiver means coupled to the array for producing the ratio of the magnitudes of $\Sigma$ and $\Delta$, $|\Delta/\Sigma|$, and the phase difference therebetween, $\angle \Delta/\Sigma$, and
   c. digital memory means coupled to said receiver means for storing the variation of at least the azimuth angle as a function of $|\Delta/\Sigma|$ and $\angle \Delta/\Sigma$ and producing a signal representative of relative azimuth angle to a target for each of said signals $|\Delta/\Sigma|$ and $\angle \Delta/\Sigma$.

5. A system according to claim 4 wherein said digital memory means is a read-only memory.

6. A system according to claim 5 wherein said read only memory further includes means for uniquely defining the elevation angle to said target for each pair of signals $|\Delta/\Sigma|$ and $\angle \Delta/\Sigma$.

7. A system according to claim 4 wherein said antenna is a circular cylindrical array.

8. A system according to claim 4 wherein said receiver incorporates two parallel channels.

9. A system according to claim 8 wherein the first channel which has a pair of signals representative of $\Sigma$ and $\Delta$ as its inputs, comprises:
   a. a pair of log amplifiers coupled to said $\Sigma$ and $\Delta$ inputs producing at their outputs the function $ln\Sigma$ and $ln\Delta$, respectively,
   b. A difference circuit coupled to said log amplifiers for producing an output signal $ln\Delta/\Sigma$,
   c. an exponential circuit coupled to said difference circuit for producing an output signal related to $|\Delta/\Sigma|$, and
   d. an analog to digital converter coupled to the output of said exponential circuit for producing a digital representation of $|\Delta/\Sigma|$.

10. A system according to claim 9 wherein said second channel has a pair of signals representative of $\Sigma$ and $\Delta$ as its inputs, comprises:
   a. a phase detector coupled to said pair of signals to produce an output representative of the phase difference therebetween, $\angle \Delta/\Sigma$, and
   b. an analog to digital converter coupled to the output of said detector for producing a digital representation of $\angle \Delta/\Sigma$.

11. A monopulse receiver system for determining the direction to a target comprising:
   a. a three dimensional antenna array for receiving complex azimuth monopulse sum and difference signals, $\Sigma$ and $\Delta$,
   b. receiver means coupled to the array for producing the ratios of the magnitudes of $\Delta$ and $\Sigma$, $|\Delta/\Sigma|$, and the phase difference therebetween, $\angle \Delta/\Sigma$, and c. digital memory means coupled to said receiver means for storing the slope related parameter of the linear estimators of the relationship between $|\Delta/\Sigma|$ and the azimuth angle, $\theta$, to said target for various $\angle \Delta/\Sigma$'s, said slope related parameter defined by the equation:

$$\hat{\theta} = K(|\Delta/\Sigma|, \angle \Delta/\Sigma) \cdot |\Delta/\Sigma| \qquad (1)$$

where $K(|\Delta/\Sigma|, \angle \Delta/\Sigma)$ is related to the slope of said linear estimators and producing a digital signal representative of the slope parameter for each pair of said $|\Delta/\Sigma|$ and $\angle \Delta/\Sigma$ signals, and d. combining means coupled to said $|\Delta/\Sigma|$ and $K(|\Delta/\Sigma|, \angle \Delta/\Sigma)$ signals for producing an output signal representative of relative azimuth as defined by said equation (1) above.

12. A monopulse receiver system for determining the direction to a target comprising:
  a. a three dimensional antenna array for receiving complex azimuth monopulse sum and different signals, $\Sigma$ and $\Delta$,
  b. receiver means coupled to the array for producing the ratios of the magnitudes of $\Delta$ and $\Sigma$, $|\Delta/\Sigma|$, and the phase difference therebetween, $\angle \Delta/\Sigma$, and
  c. digital memory means coupled to said receiver means for storing the slope and intercept related parameters of the linear segment estimations of the relationship between $|\Delta/\Sigma|$ and the azimuth angle, $\theta$, to said target for various $\angle \Delta/\Sigma$, said parameters defined by the equation $$\hat{\theta} = K(|\Delta/\Sigma|, \angle \Delta/\Sigma) \cdot |\Delta/\Sigma| + B(|\Delta/\Sigma|, \angle \Delta/\Sigma)$$

where $K(|\Delta/\Sigma|, \angle \Delta/\Sigma)$ is related to the slope of said linear estimators and $B(|\Delta/\Sigma|, \angle \Delta/\Sigma)$ is related to the intercept thereof and producing digital signals representative of the slope and intercept parameters for each pair of said $|\Delta/\Sigma|$ and $\angle \Delta/\Sigma$ signals, and
  d. combining means coupled to said $|\Delta/\Sigma|$, $K(|\Delta/\Sigma|, \angle \Delta/\Sigma)$ and $B(|\Delta/\Sigma|, \angle \Delta/\Sigma)$ signals for producing an output signal representative of relative azimuth as defined by said equation (1) above.

13. A system according to claim 12 wherein said receiver means incorporates two parallel channels.

14. A system according to claim 13 wherein the first channel which has a pair of signals representative of $\Sigma$ and $\Delta$ as its inputs, comprises:
  a. a pair of log amplifiers coupled to said $\Sigma$ and $\Delta$ inputs producing at their outputs the function $ln\Sigma$ and $ln\Delta$, respectively,
  b. a difference circuit coupled to said log amplifiers for producing an output signal $ln\Delta/\Sigma$,
  c. an exponential circuit coupled to said difference circuit for producing an output signal related to $|\Delta/\Sigma|$, and
  d. an analog to digital converter coupled to the output of said exponential circuit for producing a digital representation of $|\Delta/\Sigma|$.

15. A system according to claim 14 wherein said second channel has a pair of signals representative of $\Sigma$ and $\Delta$ as its inputs, comprising:
  a. a phase detector coupled to said pair of signals to produce an output representative of the phase difference therebetween, $\angle \Delta/\Sigma$, and
  b. an analog to digital converter coupled to the output of said detector for producing a digital representation of $\angle \Delta/\Sigma$.

16. A system according to claim 12 wherein said digital memory means is a read-only memory.

17. A system according to claim 16 further including circuit means coupled to said $|\Delta/\Sigma|$ and $\angle \Delta/\Sigma$ signals for producing an input address to said ROM which uniquely defines $K(|\Delta/\Sigma|, \angle \Delta/\Sigma)$ and $B(|\Delta/\Sigma|, \angle \Delta/\Sigma)$.

18. A system according to claim 17 wherein said combining means comprises:
  a. a multiplier means coupled to said $|\Delta/\Sigma|$ and $K(|\Delta/\Sigma|, \angle \Delta/\Sigma)$ signals for producing a multiplier output signal representative of $|\Delta/\Sigma| \cdot K(|\Delta/\Sigma|, \angle \Delta/\Sigma)$, and
  b. adder circuit means coupled to said multiplier and said ROM for combining said multiplier output signal with the intercept related function $B(|\Delta/\Sigma|, \angle \Delta/\Sigma)$ to produce an adder output signal representative of $$|\Delta/\Sigma| \cdot K(|\Delta/\Sigma|, \angle \Delta/\Sigma) + B(|\Delta/\Sigma|, \angle \Delta/\Sigma).$$

19. A system according to claim 18 further including gross pointing address means to provide an output representative of the pointing angle of said array antenna and adder means coupled to said gross pointing address means and said adder output signal to produce an absolute azimuth angle indication of the target.

20. A system according to claim 12 wherein said antenna is a circular cylindrical array.

21. A method for determining the direction to a target with a conformal array antenna and receiver/ processor comprising:
  a. generating the complex azimuth monopulse sum and difference signals $\Sigma$ and $\Delta$ from said array antenna,
  b. generating the ratio of the magnitudes of $\Sigma$ and $\Delta$, $|\Delta/\Sigma|$, and the phase difference therebetween, $\angle \Delta/\Sigma$, and
  c. estimating at least the relative azimuth to said target from a comparison of monopulse return information with a predetermined tabulation of said functions $|\Delta/\Sigma|$ and $\angle \Delta/\Sigma$.

22. A method according to claim 21 further including the step of estimating the elevation angle to said target from said comparison with a predetermined tabulation of said functions $|\Delta/\Sigma|$ and $\angle \Delta/\Sigma$.

23. A method according to claim 21 wherein said comparison is a linear estimation of said functions $|\Delta/\Sigma|$ and $\angle \Delta/\Sigma$ with respect to relative azimuth.

* * * * *